United States Patent [19]

Bugarin

[11] 4,281,949
[45] Aug. 4, 1981

[54] COMBINATION DEPTH GAUGE AND LEVEL FOR A DRILL

[76] Inventor: Tony L. Bugarin, 9808 Fair Oaks #606, Fair Oaks, Calif. 95628

[21] Appl. No.: 63,744

[22] Filed: Aug. 6, 1979

[51] Int. Cl.³ ............................................. B23B 39/00
[52] U.S. Cl. ................................. 408/241 R; 408/112
[58] Field of Search .................. 408/241 R, 241 S, 95, 408/96, 97, 98, 110, 111, 112

[56] References Cited

U.S. PATENT DOCUMENTS

| | | | |
|---|---|---|---|
| 1,590,643 | 6/1926 | Neuwelt | 408/112 |
| 2,831,376 | 4/1958 | Daniels | 408/112 |
| 3,077,129 | 2/1963 | Carles | 408/112 |
| 3,550,481 | 12/1970 | Jensen | 408/112 |
| 3,707,043 | 12/1972 | Jones | 408/112 |
| 3,746,460 | 7/1973 | Lipe | 408/112 |
| 4,113,404 | 9/1978 | Lippacher et al. | 408/241 S |

Primary Examiner—Harrison L. Hinson
Attorney, Agent, or Firm—Blair, Brown & Kreten

[57] ABSTRACT

Abstract disclosed herein is a combination depth gauge and level for a drill characterized in that a plunger mechanism is attached to the drill by means of a band type clamp. Overlying the plunger, there is provided a ruler capable of sliding within the trackway to extend out beyond the drill and bit so that the depth of a hole to be drilled can be accurately gauged. The plunger mechanism includes a casing having a spring disposed therein and the plunger is biased against the spring and has a terminal portion preferably in the shape of a cross. In use and operation, the plunger is depressed against the surface upon which the drilling is to be done, and therefor the correct angle of the drilled hole can be assured. Once the plunger has been depressed up to the length of the ruler as it has been extended beyond the drill, the depth of the hole thus drilled can be accurately determined and controlled.

5 Claims, 4 Drawing Figures

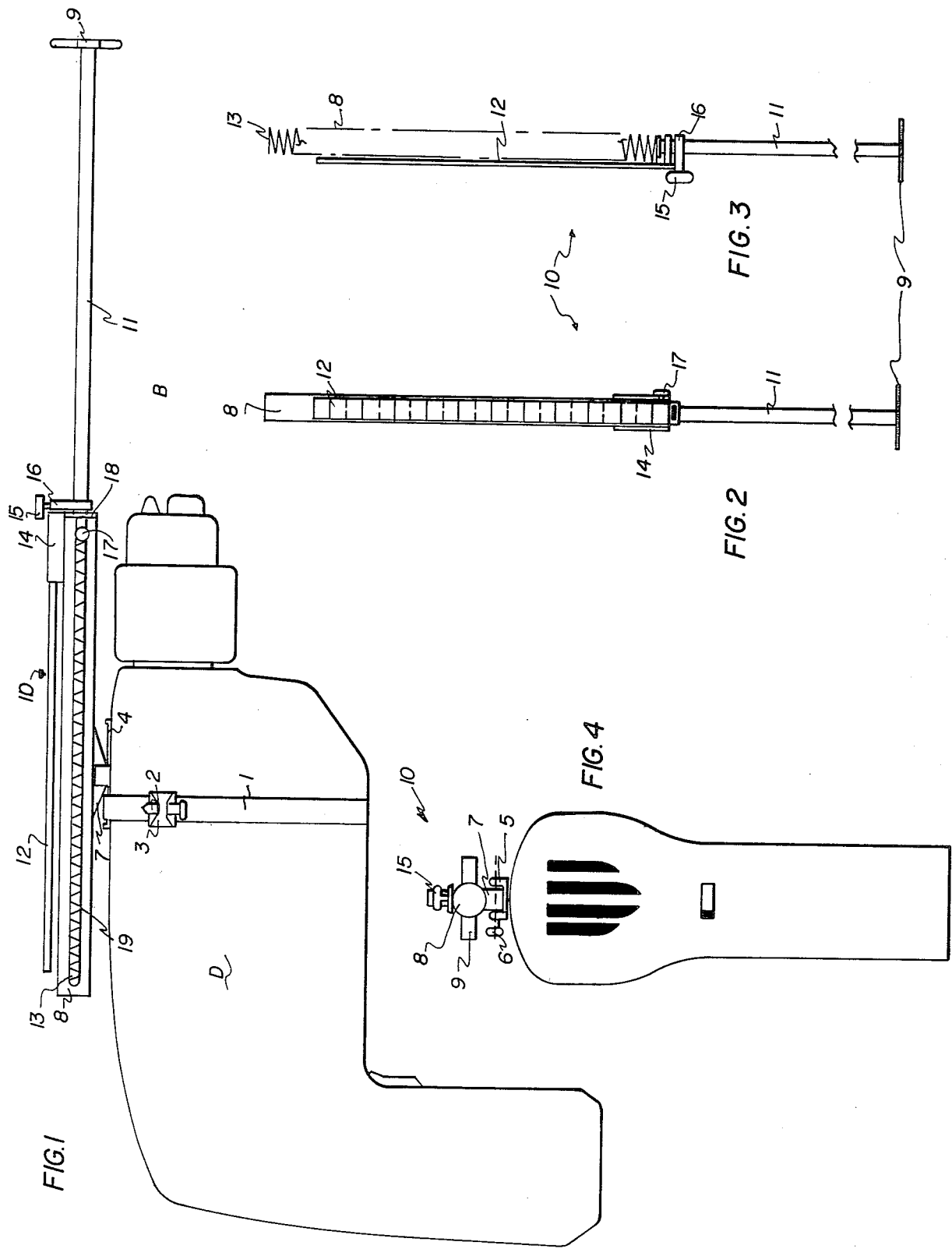

COMBINATION DEPTH GAUGE AND LEVEL FOR A DRILL

BACKGROUND OF THE INVENTION

Various types of mechanisms have been known to exist in the prior art which allow one to determine the depth of a hole that is being drilled into a surface.

An example of such a device, certainly within the field of the invention described herein below, includes the following patent: U.S. Pat. No. 4,113,404 Lippacher et al.

This and other devices similar to it can be characterized by noting that while an indication can be given as to the degree to which a drill bit has been used in boring into a surface, in many cases it is desired to provide the hole thus drilled at a specified angle relative to the surface upon which the drill is being worked so that the accurate depth to which the drill bit has been put can be known. Of course, if the drill is being held at an angle other than that which is desired, although the drill hole will be to the requisite depth, it is quite unlikely that the drill will have placed the hole at the proper angle which can have critical consequences.

SUMMARY OF THE INVENTION

Accordingly, the ensuing detailed description contemplates as an objective providing a depth gauge and guide which can accurately determine the angle of attack at which the drill bit will perform its work as well as critically monitor the exact depth thereof.

A further object contemplates providing a mechanism of the character described above in which the attachment to the drill is one that is simple, yet durable.

A further object provides for a mechanism which can be re-oriented easily so that work in close quarters or where tolerances with adjoining material can be taken in to consideration by re-orienting the device of this invention.

It is yet a further object of this invention to provide a mechanism of the character described above which is reliable, relatively simple to manufacture, and generally devoid of the defects noted in the prior art.

These and other objects will be made manifest when considering the following detailed specification when taken in conjunction with the appended drawings.

BRIEF DESCRIPTION OF THE DRAWINGS

FIG. 1 is a side view of the apparatus according to the present invention deployed on a drill.

FIG. 2 is a top plan view of the mechanism.

FIG. 3 is a side view schematic depiction of the drill gauge and level.

FIG. 4 is an end view of the apparatus while disposed on the drill.

BRIEF DESCRIPTION OF THE PREFERRED EMBODIMENT

Referring to the drawings now, wherein like reference numerals refer to like parts throughout the several drawing figures, reference numeral 10 is directed to the drill bit guide and level according to the present invention. The guide 10 can generally be regarded as having a clamp 1 used to affix the mechanism 10 to the drill, and for this purpose, the terminal extremities of the band 1 are provided with a tightening screw 2 and a threaded clamp assembly 3. By tightening the screw 2, the clamp tightens.

Constrained by the clamp 1 there is provided a support stand having a base 4 and upwardly extending ear members 5. Nestled between the pair of spaced opposed ear members 5 and extending downwardly from the rest of the gauge and level there is a V-shaped rib extending therebetween. The rib 7 and the ears 5 are pivoted together as through a pin 6 having a screw head at one extremity thereof so that once the proper angle of the instrument above the drill has been fixed, the thumbscrew 6 is turned to retain this desired angulation.

The rib 7 serves to support a casing 8 within which is disposed a spring 13. The spring serves to bias a plunger one end of which enters within the casing and the extremity remote therefrom terminates in a cross shaped guide means 9. The plunger 11 is provided with a bolt 17 which extends through a linear groove 19 which runs substantially the entire length of the casing. It is apparent therefor that as the plunger extends and retracts within the casing 8 the bolt 17 is constrained within the groove and the plunger being biased will return to a normally extended position when freed from pressure against the wall. To assure that the plunger will remain within the casing, an end cap 18 is provided (FIG. 1). Disposed substantially above and to the right of the end cap 18 there is a support mechanism through which the plunger 11 passes, and this support mechanism 16 has disposed on the top face thereof a thumbscrew 15. Contiguous therewith and directly over the casing 8 and supported thereby is a trackway 14 having a bottom face, a pair of upwardly extending side portions, and a pair of spaced opposed inwardly directed lips through which a ruler 12 having gradations thereon is inserted. By extending the ruler 12 outwardly in the direction of the plunger at an appropriate distance, holes drilled by the drill can be controlled as to their depth.

It should be apparent therefor that in use and operation, the angle of the plunger and the ruler can be oriented by means of the thumbscrew 6, and once this has been determined, the depth of the hole to be made can be adjusted by means of the ruler 12. Thereafter, the cross shaped guide piece 9 is placed against the wall, and as the drilling operation commences, the plunger retracts into the casing 8 and continues to be depressed backwardly until the ruler 12 serves as an obstruction which would indicate that the appropriate depth and angle of the hole has been achieved. Further, it should be evident that although the drawings illustrate that the guide gauge and level are disposed on the top portion of the drill, because of the adjustable nature of the band 1, this mechanism can be rotated about the drill as is necessary.

Further, it should be apparent that numerous structural modifications are contemplated as being a part of this invention as specified herein above and as delinated herein below by the claims.

What is claimed is:

1. A combination depth gauge and level for a drill and its associated drill bit comprising in combination:
an elongate plunger means defined by an elongate casing supported on the said drill, means to fasten said plunger means to the drill a spring disposed within said casing, a plunger rod partially within said casing abutting said spring and extending out from said casing towards a forward portion of the said drill, guide means on a terminal portion of said plunger rod remote from said spring, said casing including a linear groove on an elongate face thereof substantially coextensive with said casing, a bolt affixed to said plunger rod and extending out from said groove thereby constrained to ride within said groove, a depth gauge means defined by a trackway disposed on said casing, a ruler slideably disposed within said trackway and passing through a support carried on said casing at an end thereof through which said plunger rod passes, and a thumbscrew threaded on said support whereby when tightened, said thumbscrew clamps down on said ruler and said depth gauge has been locked.

2. The device of claim 1 in which said casing has a cap near said bolt to constrain said bolt in said casing.

3. The device of claim 1 in which said means to fasten said plunger to the drill comprises a support stand affixed to said casing and a band clamp overlying a portion of said stand and surrounding the drill fastened thereto.

4. The device of claim 3 in which said support stand comprises a V shaped rib depending from said casing, a pair of spaced opposed upwardly extending ears straddling said rib, a pivot extending through said ears and said rib having a tightening screw to fix said rib to said ears, and a support base carrying said ears and engaging said band clamp.

5. The device of claim 4 in which said guide means is cross shaped.

* * * * *